US007664583B2

(12) United States Patent
Fernandez et al.

(10) Patent No.: US 7,664,583 B2
(45) Date of Patent: Feb. 16, 2010

(54) ELECTRIC POWER ASSISTED STEERING APPARATUS (75) Inventors: Angel Luis Andres Fernandez, Birmingham (GB); Andrew James Stephen Williams, Warwick (GB); George Thomas Dibben, Glenfield (GB)

(73) Assignee: TRW LucasVarity Electric Steering Limited (GB)

( * ) Notice: Subject to any disclaimer, the term of this patent is extended or adjusted under 35 U.S.C. 154(b) by 78 days.

(21) Appl. No.: 10/594,135

(22) PCT Filed: Mar. 18, 2005

(86) PCT No.: PCT/GB2005/001139

§ 371 (c)(1),
(2), (4) Date: Nov. 15, 2007

(87) PCT Pub. No.: WO2005/092689

PCT Pub. Date: Oct. 6, 2005

(65) Prior Publication Data

US 2008/0189011 A1 Aug. 7, 2008

(30) Foreign Application Priority Data

Mar. 23, 2004 (GB) .................................. 0406473.9

(51) Int. Cl.
*B62D 5/04* (2006.01)
(52) U.S. Cl. .............................. 701/41; 701/42; 180/443
(58) Field of Classification Search .................. 701/41, 701/43, 42; 180/415, 412, 421, 422, 443, 180/446
See application file for complete search history.

(56) References Cited

U.S. PATENT DOCUMENTS

| 4,660,671 | A  | * | 4/1987 | Behr et al. .................. 180/446 |
| 4,664,211 | A  |   | 5/1987 | Oshita et al. |
| 6,266,591 | B1 |   | 7/2001 | Wilson-Jones et al. |
| 6,408,235 | B1 |   | 6/2002 | Tanke, II et al. |
| 6,505,702 | B1 | * | 1/2003 | Shinmura et al. ........... 180/446 |
| 6,543,572 | B2 | * | 4/2003 | Mukai et al. ................ 180/446 |

FOREIGN PATENT DOCUMENTS

EP  0 361 726 B1  12/1994
WO  WO 02/066310 A1  8/2002

* cited by examiner

*Primary Examiner*—Richard M. Camby
(74) *Attorney, Agent, or Firm*—MacMillan, Sobanski & Todd, LLC (57) ABSTRACT

An electric power assisted steering apparatus for a vehicle, comprises a steering mechanism, which operatively connects a steering wheel to the road wheels of the vehicle, an electric motor operatively connected to the steering mechanism, a torque sensing means adapted to produce a first output signal indicative of the torque carried by a portion of the steering mechanism, a vehicle speed sensing means for producing a second output signal indicative of the speed of the vehicle, a signal processing unit adapted to receive the first and second signals and to produce a torque demand signal representative of a torque to be applied to the steering mechanism by the motor; and a motor drive stage adapted to provide a drive current to the motor responsive to the torque demand signal. The apparatus includes torque limiting means, arranged to limit the magnitude of the torque to be applied to the steering mechanism to a maximum of a value that increases in time from a first value to a second value at a rate that is dependent on the second signal. Additionally or alternatively, it may be arranged to limit the maximum torque to a value that increases from a first to a second value at a rate that varies with time.

20 Claims, 4 Drawing Sheets

Fig. 7

ELECTRIC POWER ASSISTED STEERING APPARATUS

CROSS-REFERENCE TO RELATED APPLICATIONS

This application is a national stage of International Application No. PCT/GB2005/001139 filed Mar. 18, 2005, the disclosures of which are incorporated herein by reference, and which claimed priority to Great Britain Patent Application No. 0406473.9 filed Mar. 23, 2004, the disclosures of which are incorporated herein by reference.

BACKGROUND OF THE INVENTION

This invention relates to electric power assisted steering apparatus of the kind in which an electric motor is adapted to apply an assistance torque to a steering component such as a steering column so as to reduce the driver effort required to control the vehicle.

In a simple electric power assisted steering (EPAS) apparatus a torque sensor is provided which is arranged so that the level of torque in a steering column is measured. From this measurement a controller calculates the value of a torque demand signal, which includes an assistance torque component that is indicative of the torque that is to be generated by an electric motor attached to the steering column. The motor applies an assistance torque to the column of the same sense as that demanded by the driver and thus reduces the effort needed to turn the wheel.

When such an apparatus is initially powered up, it may be the case that the controller calculates that a high assistance torque is required. Herein, "powered-up" and associated phrases should be read to include any state in which the EPAS apparatus is initialised after a loss of power. However, if such a torque were to be applied to the steering system immediately, then the resultant sudden movement of the steering system may alarm the driver of the vehicle. Accordingly, in prior art EPAS apparatus, the assistance torque limited to a value that is ramped up linearly from substantially zero over a period of time, say approximately one second.

The ramp is generally expressed as a variable percentage of the maximum torque that can be generated by the EPAS apparatus; this percentage is increased linearly with time. Expressing the ramp as a percentage enables the same ramp to be scaled to different apparatus having differing maximum torques and hence the ramp to be used on different vehicles.

BRIEF SUMMARY OF THE INVENTION

According to a first aspect of the invention, there is provided an electric power assisted steering apparatus for a vehicle, comprising:

a steering mechanism, which operatively connects a steering wheel to the road wheels of the vehicle;

an electric motor operatively connected to the steering mechanism;

a torque sensing means adapted to produce a first output signal indicative of the torque carried by a portion of the steering mechanism;

a vehicle speed sensing means for producing a second output signal indicative of the speed of the vehicle;

a signal processing unit adapted to receive the first and second signals and to produce a torque demand signal representative of a torque to be applied to the steering mechanism by the motor; and a motor drive stage adapted to provide a drive current to the motor responsive to the torque demand signal, in which the apparatus includes torque limiting means, arranged to limit the magnitude of the torque to be applied to the steering mechanism to a maximum of a value that increases in time from a first value to a second value at a rate that is dependent on the second signal.

Prior art systems have previously assumed that the EPAS apparatus is powered up with the vehicle at rest, for example when the vehicle engine is started. If the apparatus is powered up whilst the vehicle is moving—for example if power is lost, then regained due to a loose battery terminal in the power supply to the EPAS apparatus—the level of assistance provided by the prior art apparatus described above will ramp up too quickly for the driver of the vehicle to react.

Powering-up is particularly a problem when the apparatus starts up at high vehicle speed combined with high steering column torque, as would be the case if the apparatus were to start up when the vehicle was cornering at high speed. The EPAS apparatus would apply a large assistance torque to the steering column quicker that the driver could react to, causing an unpleasant and possibly dangerous overshoot on the column position and hence steering angle.

Making the rate at which the apparatus ramps up the torque limit dependent on the vehicle speed is advantageous as it allows the apparatus to allow for the apparatus being powered up at speed, whilst not necessarily affecting the behaviour of the apparatus when the vehicle is at rest.

Indeed, in a preferred embodiment of the invention, the magnitude of the torque is limited when the apparatus is powered-up. The apparatus may limit the magnitude of the torque for a period starting when the apparatus is powered up; the period may last 1, 2, 5, 10 or any suitable number of seconds.

By limit, we may mean that the apparatus may include a comparison means, which is arranged to compare the magnitude of the torque represented by the torque demand signal and the torque limit and cause the motor to apply a torque having a magnitude of the lower of the two compared values to the steering mechanism.

The limit may be expressed as a fraction or percentage of the maximum torque available to be applied to the steering mechanism by the motor. The first value may be zero torque.

The apparatus may further include a speed mapping means, which is arranged to generate from the vehicle speed a torque limit increase signal indicative of the rate at which the torque limit is to increase. The torque limit increase rate for a first vehicle speed may be higher than the torque limit increase rate at a second, higher, vehicle speed. The speed mapping means may determine the torque limit increase rate between the first and second speeds by interpolation, typically linear interpolation. Reducing the rate at which the apparatus increases the torque limit for higher speeds will make powering up whilst the vehicle is moving less noticeable to the driver of the vehicle.

There may be a plurality of points at increasing vehicle speed at which the torque limit increase rate is defined as decreasing relative to the previous point. The speed mapping means may determine the torque limit increase rate between successive points by interpolation, typically linear interpolation.

The speed mapping means may be arranged to generate, from the torque limit increase signal, the torque limit to be passed to the torque limiting means. The speed mapping means may calculate the torque limit as increasing linearly at the torque limit increase rate.

Alternatively, the torque limit generated by the speed mapping means may increase non-linearly. The rate at which the torque limit increases may increase with time. Increasing the rate at which the torque limit increases allows the rate at which assistance is introduced to be lower than should the rate be constant, hence introducing the assistance smoothly with less chance of alarming a driver or causing the steering mechanism to overshoot without the driver being able to compensate. The increased rate at later times allows the time in which the ramp-up completes to be comparable to that which would previously have been used with a constant rate ramp-up.

The speed mapping means may include intermediate value generating means and non-linear mapping means, where the intermediate value increases linearly at the torque limit increase rate. The non-linear mapping means may be arranged to map the intermediate value to generate the torque limit using a non-linear map. The map may be defined by at least three points defining the relationship between the intermediate value and the torque limit at those points. Defining the gradient between pairs of points as the difference in torque limit between the points divided by the difference in intermediate value between the points, successive pairs of points in increasing intermediate value may have an increasing gradient between them. The torque limit between the points may be determined by interpolation, typically linear interpolation.

The apparatus may include filter means, to filter the measured vehicle speed. This may be a low pass filter.

The apparatus may include offset means, which take as an input the torque limit and combine the torque limit with an additive offset. The apparatus may also include cap means, which cap the torque limit to a maximum value, which may be 100% of the torque available to be applied by the apparatus to the steering mechanism.

According to a second aspect of the invention, there is provided an electric power assisted steering apparatus for a vehicle, comprising:

a steering mechanism, which operatively connects a steering wheel to the road wheels of the vehicle;

an electric motor operatively connected to the steering mechanism;

a torque sensing means adapted to produce a first output signal indicative of the torque carried by a portion of the steering mechanism;

a signal processing unit adapted to receive the first signal and to produce a torque demand signal representative of a torque to be applied to the steering mechanism by the motor; and a motor drive stage adapted to provide a drive current to the motor responsive to the torque demand signal, in which the apparatus includes torque limiting means, arranged to limit the magnitude of the torque to be applied to the steering mechanism to a maximum of a value that increases from a first value to a second value at a rate that varies with time.

In the preferred embodiment, the rate at which the torque limit increases increases with time. Increasing the rate at which the torque limit increases allows the rate at which assistance is introduced to be lower than should the rate be constant, hence introducing the assistance smoothly with less chance of alarming a driver or causing the steering mechanism to overshoot without the driver being able to compensate. The increased rate at later times allows the time in which the ramp-up completes to be comparable to that which would previously have been used with a constant rate ramp-up.

Indeed, in a preferred embodiment of the invention, the magnitude of the torque is limited when the apparatus is powered-up. The apparatus may limit the magnitude of the torque for a period starting when the apparatus is powered up; the period may last 1, 2, 5, 10 or any suitable number of seconds.

By limit, we may mean that the apparatus may include a comparison means, which is arranged to compare the magnitude of the torque represented by the torque demand signal and the torque limit and cause the motor to apply a torque having a magnitude of the lower of the two compared values to the steering mechanism.

The limit may be expressed as a fraction or percentage of the maximum torque available to be applied to the steering mechanism by the motor. The first value may be zero torque.

The torque limiting means may include intermediate value generating means and non-linear mapping means. The intermediate value generating means may be arranged to generate an intermediate value that increases linearly at a torque limit increase rate. The non-linear mapping means may be arranged to map the intermediate value to generate the torque limit using a non-linear map. The map may be defined by at least three points defining the relationship between the intermediate value and the torque limit at those points. Defining the gradient between pairs of points as the difference in torque limit between the points divided by the difference in intermediate value between the points, successive pairs of points in increasing intermediate value may have an increasing gradient between them. The torque limit between the points may be determined by interpolation, typically linear interpolation.

The apparatus may further comprise a vehicle speed sensing means for producing a second output signal indicative of the speed of the vehicle. In such a case, the rate at which the torque limit increases may be dependent upon the second output signal. Accordingly, the apparatus may have any of the optional features of the first aspect of the invention.

According to a third aspect of the invention, there is provided a method of controlling an electric power assisted steering apparatus for a vehicle having a steering mechanism, comprising:

measuring the torque in a part of the steering apparatus; and calculating a torque demand signal indicative of the torque to be applied to the steering mechanism by an electric motor;

in which the magnitude of the torque to be applied to the steering system is limited to a maximum value, which depends on the speed of the vehicle.

Making the rate at which the apparatus ramps up the torque limit dependent on the vehicle speed is advantageous as it allows the apparatus to allow for the apparatus being powered up at speed, whilst not necessarily affecting the behaviour of the apparatus when the vehicle is at rest.

Indeed, in a preferred embodiment of the invention, the magnitude of the torque is limited when the apparatus is powered-up. The method may limit the magnitude of the torque for a period starting when the apparatus is powered up; the period may last 1, 2, 5, 10 or any suitable number of seconds.

By limit, we may mean that the magnitude of the torque represented by the torque demand signal and the torque limit are compared such that the motor is caused to apply a torque having a magnitude of the lower of the two compared values to the steering mechanism.

The limit may be expressed as a fraction or percentage of the maximum torque available to be applied to the steering mechanism by the motor. The first value may be zero torque.

The method may further include the step of generating a torque limit increase signal from the vehicle speed indicative of the rate at which the torque limit is to increase. The torque limit increase rate for a first vehicle speed may be higher than the torque limit increase rate at a second, higher, vehicle speed. The method may determine the torque limit increase rate between the first and second speeds by interpolation, typically linear interpolation. Reducing the rate at which the torque limit is increased for higher speeds will make powering up whilst the vehicle is moving less noticeable to the driver of the vehicle.

There may be a plurality of points at increasing vehicle speed at which the torque limit increase rate is defined as decreasing relative to the previous point. The method may determine the torque limit increase rate between successive points by interpolation, typically linear interpolation.

The method may calculate the torque limit as increasing linearly at the torque limit increase rate.

Alternatively, the torque limit may increase non-linearly. The rate at which the torque limit increases may increase with time. Increasing the rate at which the torque limit increases allows the rate at which assistance is introduced to be lower than should the rate be constant, hence introducing the assistance smoothly with less chance of alarming a driver or causing the steering mechanism to overshoot without the driver being able to compensate. The increased rate at later times allows the time in which the ramp-up completes to be comparable to that which would previously have been used with a constant rate ramp-up.

The method may include the steps of generating an intermediate value, where the intermediate value increases linearly at the torque limit increase rate. The method may then map the intermediate value to generate the torque limit using a non-linear map. The map may be defined by at least three points defining the relationship between the intermediate value and the torque limit at those points. Defining the gradient between pairs of points as the difference in torque limit between the points divided by the difference in intermediate value between the points, successive pairs of points in increasing intermediate value may have an increasing gradient between them. The torque limit between the points may be determined by interpolation, typically linear interpolation.

The method may include the step of filtering the measured vehicle speed. The filter may be a low pass filter, with a typical cut-off frequency of X Hz.

The method may include the step of combining the torque limit with an additive offset. The method may also include the step of capping the torque limit to a maximum value, which may be 100% of the torque available to be applied by the apparatus to the steering mechanism. These steps enable use of the ramp-up method in other situations than or in addition to power up.

According to a fourth aspect of the invention, there is provided a method of controlling an electric power assisted steering apparatus for a vehicle having a steering mechanism, comprising:

measuring the torque in a part of the steering apparatus; and calculating a torque demand signal indicative of the torque to be applied to the steering mechanism by an electric motor;

in which the magnitude of the torque to be applied to the steering system is limited to a maximum value, which increases at a rate that varies with time.

In the preferred embodiment, the rate at which the torque limit increases increases with time. Increasing the rate at which the torque limit increases allows the rate at which assistance is introduced to be lower than should the rate be constant, hence introducing the assistance smoothly with less chance of alarming a driver or causing the steering mechanism to overshoot without the driver being able to compensate. The increased rate at later times allows the time in which the ramp-up completes to be comparable to that which would previously have been used with a constant rate ramp-up.

Indeed, in a preferred embodiment of the invention, the magnitude of the torque is limited when the apparatus is powered-up. The method may limit the magnitude of the torque for a period starting when the apparatus is powered up; the period may last 1, 2, 5, 10 or any suitable number of seconds.

By limit, we may mean that the magnitude of the torque represented by the torque demand signal and the torque limit are compared such that the motor is caused to apply a torque having a magnitude of the lower of the two compared values to the steering mechanism.

The limit may be expressed as a fraction or percentage of the maximum torque available to be applied to the steering mechanism by the motor. The first value may be zero torque.

The method may include the steps of generating an intermediate value that increases linearly at a torque limit increase rate. The method may then map the intermediate value to generate the torque limit using a non-linear map. The map may be defined by at least three points defining the relationship between the intermediate value and the torque limit at those points. Defining the gradient between pairs of points as the difference in torque limit between the points divided by the difference in intermediate value between the points, successive pairs of points in increasing intermediate value may have an increasing gradient between them. The torque limit between the points may be determined by interpolation, typically linear interpolation.

The method may further comprise the steps of determining the vehicle speed. In such a case, the rate at which the torque limit increases may be dependent upon the vehicle speed. Accordingly, the method may have any of the optional features of the third aspect of the invention.

According to a fifth aspect of the invention, there is provided a data carrier carrying a program which, when loaded onto a processor of a suitable apparatus, causes the apparatus to carry out the method of the third or fourth aspects of the invention.

Other advantages of this invention will become apparent to those skilled in the art from the following detailed description of the preferred embodiments, when read in light of the accompanying drawings.

DETAILED DESCRIPTION OF THE INVENTION

Figure 1:
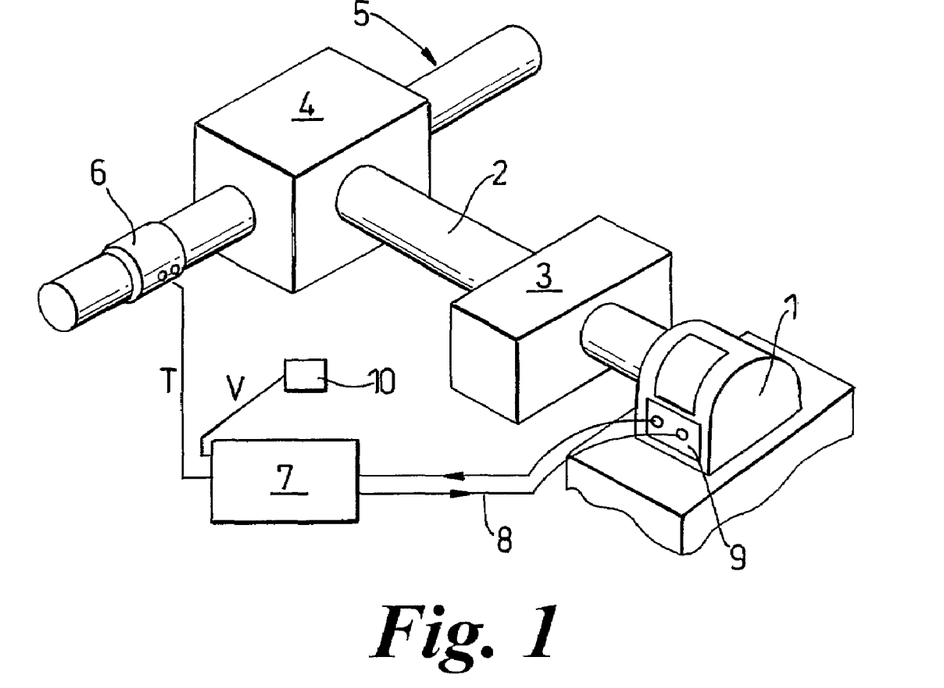
FIG. 1 shows a schematic diagram of an electric power assisted steering system in accordance with the present invention.

An electric power assisted steering apparatus is illustrated in FIG. 1 of the accompanying drawings. The system comprises an electric motor 1, which acts upon a drive shaft 2 through an optional gearbox 3. The drive shaft 2 terminates with a worm gear 4 that co-operates with a wheel provided on a portion of a steering column 5 or a shaft operatively connected to the steering column.

The steering column 5 carries a torque sensor 6 that is adapted to measure the torque carried by the steering column that is produced by the driver of the vehicle as the steering wheel (not shown) and hence steering column is turned against the resisting force provided by the vehicles road wheels (also not shown). The output signal T from the torque sensor 6 is fed to a first input of a signal processing means 7. This is typically an electrical circuit, more specifically an ASIC dedicated integrated circuit.

A vehicle speed sensor 10 is also provided. This senses the rotational speed of the axle of one of the road wheels (not shown) as is common in the prior art. Typically, this could be the vehicle speedometer. The speed sensor includes filter means, being a low pass filter such that high frequency changes in speed do not affect the operation of the ramp-up. The output signal V from the speed sensor is fed to a second input of the signal processing means 7.

The signal processing means 7 acts upon the two input signals to produce, as its output, a torque demand signal 8 that is passed to a motor controller 9. The motor controller 9 converts the torque demand signal 8 into drive currents for the electric motor 1.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel.

Figure 2:
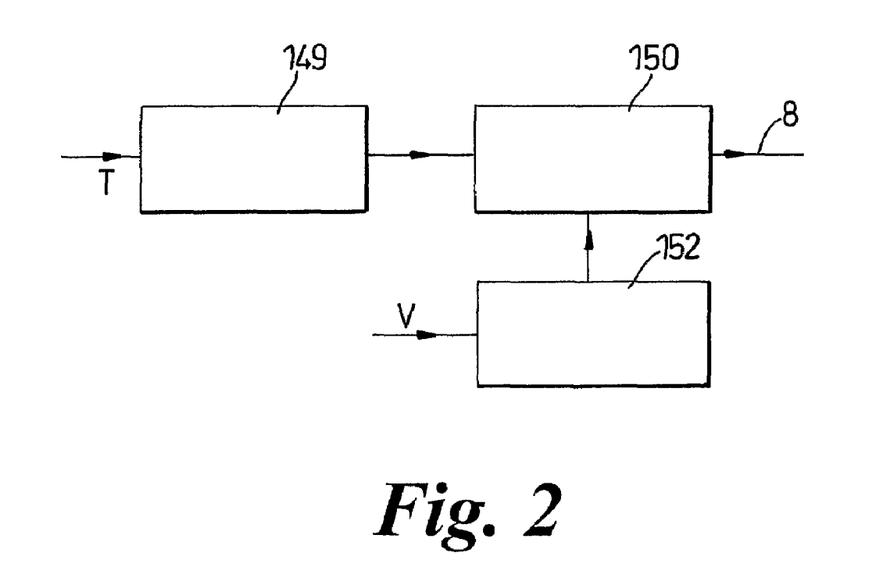
FIG. 2 shows a schematic diagram of the functions carried out within the signal processor of the first aspect of the invention.

The signal processor provides several processing means. In a first embodiment shown in FIG. 2 of the accompanying drawings, the processor 7 includes a demand calculating means 149, which calculates a torque demand from the output of the torque sensor in a manner well known in the prior art. The output of the demand calculating means is passed to an input of a torque limiting means 150, which is adapted to limit the maximum magnitude of torque that may be requested by the signal processor. The value of the limit is calculated by a speed mapping means 152, which takes as an input the output of the vehicle speed sensor 10. The output of the speed mapping means is expressed as a fraction or percentage of the maximum assistance torque available from the apparatus. The output of the mapping means 152 is passed to the torque limiting means such that the torque limit is increased at a slew-up rate (in percent per second) that depends on the vehicle speed as measured by the vehicle speed sensor 10.

Figure 3:
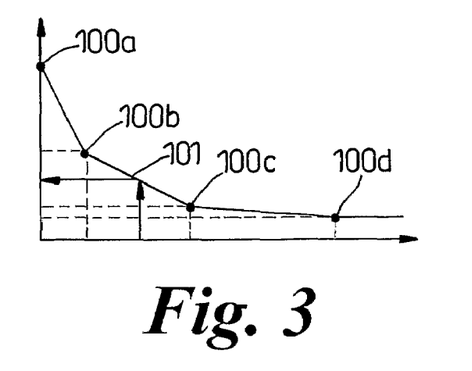
FIG. 3 shows a graph of the rate at which the vehicle speed is ramped up against vehicle speed for a first embodiment of the invention.

FIG. 3 of the accompanying drawings shows the relationship that the speed mapping means applies to the vehicle speed (shown on the x-axis) to calculate the slew-up rate (shown on the y-axis). A plurality of points 100a, 100b, 100c, 100d are defined that define the slew-up rate at particular vehicle speeds. These are arranged such that a point at zero speed 100a the ramp-up occurs at the same rate had the vehicle speed not been taken into account. Each of the successive points in increasing vehicle speed represents a reduction in the slew-up rate on the previous point. The slew-up rate between the points is determined by linear interpolation, as depicted by line 101.

Figure 4:
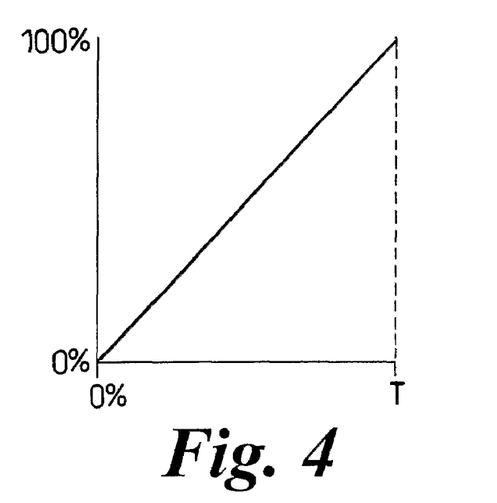
FIG. 4 shows a graph depicting how the torque limit increases with time for the first embodiment of the invention.

The output of the speed mapping means 152, and hence the torque limit applied by the limiting means 150 can be seen in FIG. 4 of the accompanying drawings. The torque limit rises linearly from the initial value of zero to 100% of the available torque over a time T, where the torque limit depends on the vehicle speed. Of course, should the signal processing unit calculate that the torque assistance to be applied should be less than the torque limit, the lower calculated torque would be applied.

In a second embodiment of the invention, the same apparatus is provided as in the first embodiment of the invention, with the exception that extra means are provided in the signal processing device in order to process the slew-up rate further. These can be seen in FIG. 7 of the accompanying drawings. As the EPAS apparatus is powered up, an initialisation means 201 sets the initial torque limit and an intermediate value (the relevance of which will become apparent) to zero. A speed mapping means 202 takes as an input the output of the vehicle speed sensor 10 and calculates a slew-up rate in the same manner as in the first embodiment of the invention.

An intermediate value calculator 203 takes as its inputs the slew-up rate output by the speed mapping means 202 and a previous value of the intermediate value. From this, it calculates an intermediate value 102 as the previous value of the intermediate value (initially set to zero by the initialisation means) increased by the amount indicated by the slew-up rate. Accordingly, the intermediate value is calculated in the same way as the torque limit of the first embodiment and can be visualised as FIG. 3 of the accompanying drawings.

A non-linear mapping means 204 takes as an input the intermediate value and maps that by a non-linear map, as shown in FIG. 4 of the accompanying drawings. In the Figure, the input to the mapping means—that is the intermediate value—is shown along the x-axis, with the output along the y-axis. As in the case of the vehicle speed to slew-up rate map, the map comprises a number of points 110a, 110b, 110c, in input-output space, each fixing the relationship between the input and output of the map at each point with the output value at zero input being zero. The relationship at other points is determined by linear interpolation. The points are arranged such that the rate of increase of the output value relative to the input value increases with the input value.

This mapping means reduces the torque limit at low values of the intermediate value and hence at small times after start-up. This allows for a smoother start-up of the EPAS apparatus. However, in order for the overall time taken by the ramp-up procedure to take place in a comparable amount of time to prior art constant slew-up rate ramp-up procedures, the torque limit is greatly increased as the intermediate value, and hence time, increases.

Figure 5:
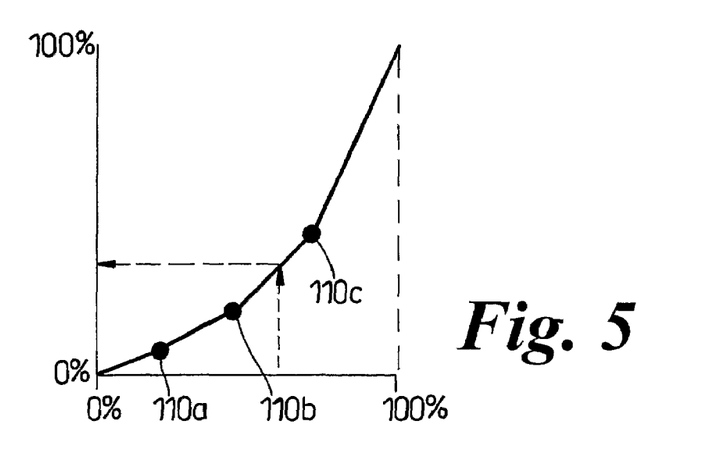
FIG. 5 shows a graph depicting how the torque limit of FIG. 4 can be mapped to provide a mapped torque limit according to the second embodiment of the invention.
Figure 6A:
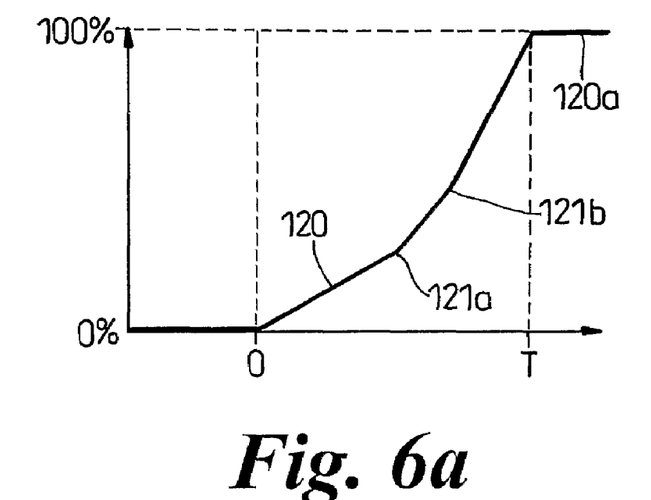
FIGS. 6a and 6b show graphs depicting how the torque limit of the second embodiment of the invention varies with time.
Figure 6B:
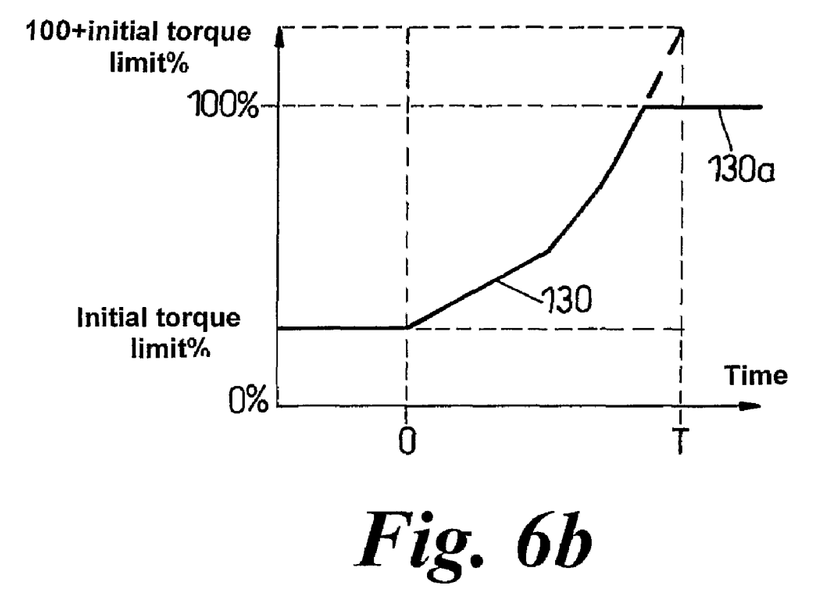

The resultant torque limit as time progresses can be seen in FIG. 5a of the accompanying drawings. The torque limit curve 120 increases linearly at, initially, a relatively shallow rate, which increases at break points 121a, 121b.

Figure 7:
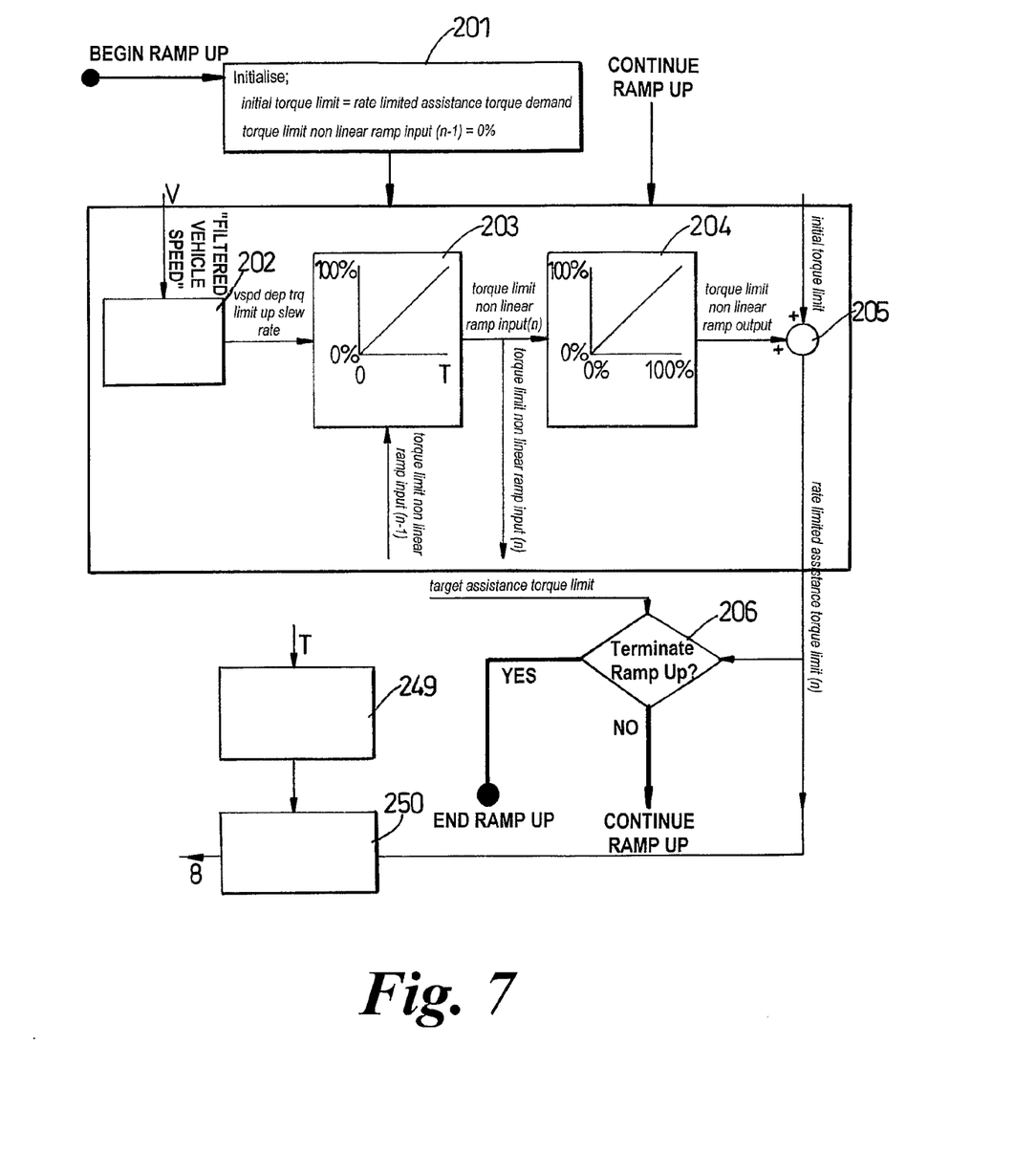
FIG. 7 shows a flow diagram showing the functional steps taken within the signal processor according to the second aspect of the invention.

It is desired that the power-up procedure be usable in other situations than when the EPAS apparatus initially starts. This could be in such situations as X. Accordingly, adding means 205 sums its inputs of an initial torque limit offset and the output of the mapping stage 204. This offsets the torque limit by a generally fixed amount. A comparator then determines whether the target torque limit—typically 100% of available torque—has been achieved and if not (step 206) allows the process from step 201 a time interval later.

This addition of an offset followed by the determination whether the torque limit has been reached allows use of the ramp-up procedure in other situations than initial start-up and ensures that the maximum torque limit never exceeds the maximum torque limit required—a torque limit of over 100% of the available torque would be a nonsense. Use of an offset can be seen in FIG. 5b of the accompanying drawings (in comparison with FIG. 5a of the accompanying drawings). FIG. 5b shows the case where an initial torque limit has offset the torque. The resultant torque limit curve 131 is offset by the amount of the initial offset, but shares the same maximum 121, 131.

As in the previous embodiment, a demand calculating means 249 calculates a torque demand from the measured steering column torque. This is then limited by torque limiting means 250 according to the torque limit as finally calculated by the adding means 205. The output of the limiting means is the torque demand signal 8, which is applied to the motor controller 9 in the usual fashion.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electric power assisted steering apparatus for a vehicle having a steering wheel and road wheels, comprising:
    a steering mechanism, which operatively connects said steering wheel to said road wheels of the vehicle;
    an electric motor operatively connected to said steering mechanism;
    a torque sensor adapted to produce a first output signal indicative of the torque carried by a portion of said steering mechanism;
    a vehicle speed sensor for producing a second output signal indicative of the speed of said vehicle;
    a signal processing unit adapted to receive said first signal and second signal and to produce a torque demand signal representative of a torque to be applied to said steering mechanism by said motor; and
    a motor drive stage adapted to provide a drive current to said motor responsive to said torque demand signal,
    wherein said apparatus includes torque limiting device, arranged to limit the magnitude of said torque to be applied to said steering mechanism to a maximum of a value that increases in time from a first value to a second value at a rate that is dependent on said second signal.

2. An electric power assisted steering apparatus of claim 1 wherein said torque limiting device is arranged to limit the magnitude of said torque when said apparatus is powered-up.

3. An electric power assisted steering apparatus of claim 1 further comprising a speed mapping device, arranged to generate from said vehicle speed a torque limit increase signal indicative of a rate at which said torque limit is to increase.

4. An electric power assisted steering apparatus of claim 3 wherein said the torque limit increase rate for a first vehicle speed is higher than said torque limit increase rate at a second, higher, vehicle speed.

5. An electric power assisted steering apparatus of claim 3 wherein said speed mapping device determines the torque limit increase rate between said first speed and second speeds by interpolation.

6. An electric power assisted steering apparatus of claim 3 wherein said speed mapping device is arranged to generate, from said torque limit increase signal, said torque limit to be passed to said torque limiting device.

7. An electric power assisted steering apparatus of claim 6 wherein said speed mapping device is arranged to calculate a torque limit as increasing linearly at said torque limit increase rate.

8. An electric power assisted steering apparatus of claim 6 wherein said torque limit increases non-linearly.

9. An electric power assisted steering apparatus of claim 8 wherein said the rate at which said torque limit increases with time.

10. An electric power assisted steering apparatus of claim 8 wherein said speed mapping device includes an intermediate value generating device and a non-linear mapping device, where said intermediate value generating device generates an intermediate value which increases linearly at said torque limit increase rate and said non-linear mapping device is arranged to map said intermediate value to generate said torque limit using a non-linear map.

11. An electric power assisted steering apparatus of claim 10 in which said map is defined by at least three points defining a relationship between said intermediate value and said torque limit at those points, and in which successive pairs of points in increasing intermediate value have an increasing gradient between them.

12. The electric power assisted steering apparatus of claim 1 further comprising a filter to filter the measured vehicle speed, said filter being a low pass filter.

13. An electric power assisted steering apparatus of claim 1 further comprising an offset device, which take as an input the torque limit and combine the torque limit with an additive offset.

14. An electric power assisted steering apparatus of claim 1 further comprising a cap device, which cap the torque limit to a maximum value.

15. An electric power assisted steering apparatus for a vehicle having a steering wheel and road wheels, comprising:
    a steering mechanism, which operatively connects said steering wheel to said road wheels of said vehicle;
    an electric motor operatively connected to said steering mechanism;
    a torque sensing device adapted to produce a first output signal indicative of a torque carried by a portion of said steering mechanism;
    a signal processing unit adapted to receive said first signal and to produce a torque demand signal representative of a torque to be applied to said steering mechanism by said motor; and
    a motor drive stage adapted to provide a drive current to said motor responsive to said torque demand signal,
    wherein said apparatus includes a torque limiting device, arranged to limit the magnitude of said torque to be applied to said steering mechanism to a maximum of a value that increases from a first value to a second value at a rate that varies with time.

16. An electric power assisted steering apparatus of claim 15 in which said torque limiting device is arranged to limit the magnitude of said torque when said apparatus is powered-up.

17. An electric power assisted steering apparatus of claim 15 wherein said rate at which said torque limit varies increases with time.

18. An electric power assisted steering apparatus of claim 15 in which said torque limiting device includes an intermediate value generating device and a non-linear mapping device, wherein said intermediate value generating device is arranged to generate an intermediate value that increases linearly at a torque limit increase rate and said non-linear mapping device is arranged to map said intermediate value to generate said torque limit using a non-linear map.

19. An electric power assisted steering apparatus of claim 18 wherein said map is defined by at least three points defining a relationship between said intermediate value and said torque limit at those points, in which successive pairs of points in increasing intermediate value have an increasing gradient between them.

20. An electric power assisted steering apparatus of claim 15 further comprising a vehicle speed sensor for producing a second output signal indicative of a speed of said vehicle, in which said rate at which said torque limit increases is dependent upon said second output signal.

* * * * *

UNITED STATES PATENT AND TRADEMARK OFFICE
CERTIFICATE OF CORRECTION

PATENT NO. : 7,664,583 B2  Page 1 of 1
APPLICATION NO. : 10/594135
DATED : February 16, 2010
INVENTOR(S) : Fernandez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this

Thirtieth Day of November, 2010

David J. Kappos
*Director of the United States Patent and Trademark Office*